United States Patent [19]

Pack et al.

[11] 4,333,849
[45] Jun. 8, 1982

[54] ENCAPSULATION PROCESS

[75] Inventors: Gary D. Pack, Waverly; Frederick D. Weaver, Chillicothe, both of Ohio

[73] Assignee: The Mead Corporation, Dayton, Ohio

[21] Appl. No.: 155,683

[22] Filed: Jun. 2, 1980

[51] Int. Cl.³ .............................................. B01J 13/02
[52] U.S. Cl. ................................. 252/316; 428/320.6; 428/914
[58] Field of Search ..................... 252/316; 428/320.6, 428/914

[56] References Cited

U.S. PATENT DOCUMENTS

| | | | |
|---|---|---|---|
| 3,754,062 | 8/1973 | Kobayashi | 252/316 X |
| 4,221,710 | 9/1980 | Hoshi et al. | 252/316 X |
| 4,251,386 | 2/1981 | Saeki et al. | 252/316 |

Primary Examiner—Richard D. Lovering
Attorney, Agent, or Firm—Stephen H. Cagle; Charles N. Shane, Jr.; Wilson G. Palmer

[57] ABSTRACT

A process is disclosed for the manufacture of microcapsules which comprises the steps of preparing hydrophobic and hydrophilic phase components. The hydrophobic phase component comprises a homogeneous solution of an electron donating chromogenic material and a hydrophobic material. The hydrophilic phase component comprises a mixture of a regulating agent and water, the regulating agent being a starch material. The hydrophobic phase component is combined with a hydrophilic phase component to form an oil-in-water emulsion. The oil-in-water emulsion further contains aqueous solutions of urea, resorcinol and formaldehyde. The pH of the oil-in-water emulsion is adjusted to a level at which the capsule wall forming reaction is initiated by the addition of a catalyst. The temperature of the partially reacted oil-in-water emulsion is then elevated to from about 50° C. to about 80° C. and this temperature is maintained for a period of time sufficient to form discrete microcapsules characterized by being substantially impermeable to the hydrophobic emulsion component.

13 Claims, No Drawings

ENCAPSULATION PROCESS

BACKGROUND OF THE INVENTION

1. Field of the Invention

This invention relates to microencapsulating processes and the microcapsules produced therefrom.

2. The Prior Art

A method for the production of microcapsules containing oils using coacervation is disclosed in U.S. Pat. No. 2,800,457 (1957) to Green et al. The process described therein involves the coating of oil droplets with a liquid wall of gelatin/gum arabic colloidal material produced by coacervation. The liquid wall thus formed is hardened by treatment with formaldehyde. It is known that aqueous solutions of hydrophilic colloids such as gelatins or gun arabics can be caused to undergo coacervation by adding to said solutions various substances such as inorganic salts or oppositely charged colloids. The coacervate droplets are known to encase droplets of water-immiscible or slightly water-immiscible liquids and to gel and solidify upon cooling to room temperatures thereby forming liquid droplets encased in a gelatin membrane. After hardening to the gelatin membranes in the normal fashion (such as with formaldehyde) encapsulated suspensions of liquids are obtained which after removal of water could be transformed by known drying methods into free-flowing dry powders. Other known patents teaching coacervation-related processes include:

U.S. Pat. No. 3,244,640 (1966) to Studt et al.
U.S. Pat. No. 3,539,465 (1970) to Heistand
U.S. Pat. No. 3,567,650 (1971) to Balcan
U.S. Pat. No. 3,594,326 (1971) to Himmel Other patents teaching processes of producing oil containing microcapsules include: U.S. Pat. No. 3,432,327 (1969) to Masao Kan et al. teaching interfacial reaction of a water soluble substance and oil soluble substance to form a resinous microcapsule wall, and U.S. Pat. No. 3,779,941 (1973) to Powell teaching the interfacial reaction of water soluble and oil soluble polymers, and U.S. Pat. No. 3,016,308 (1962) to Macaulay teaching a method of producing microcapsules by spray drying an emulsion which contains a film-forming substance in the continuous phase.

All of the above described processes of microencapsulation suffer from one or more of the following disadvantages, particularly, if commercial production of the resulting microcapsules, for use in aqueous coating compositions, is desired. Either the process requires a series of complex steps including special apparatus and in most instances coacervation, or the microcapsules produced by the process cannot be conveniently used in aqueous coating compositions. In some of the above patented processes, most notably those involving interfacial polymerization, the wall thickness is limited because of the need for diffusion of at least one of the reactants through the microcapsule wall. The use of coacervation in a microencapsulation process suffers from other disadvantages in that coacervation results in the production of clusters and aggregates of microcapsules as opposed to the more desirable production of discrete individual microcapsules.

The process of this invention includes a number of advantages not found in prior art methods. The materials used are relatively inexpensive and are readily available in commercial quantities. The process requires no complex steps, simply emulsification of the desired droplet solution in the solution containing the wall forming compound and then temperature adjustment to initiate the reaction of the wall forming compound and to form the microcapsule wall. Because of the non-sticky nature of the wall forming compounds, microencapsulation of single droplets of oil is easily obtained, even at relatively high concentrations, as opposed to the clusters and aggregates generally obtained by coacervation. The wall thickness of the microcapsules is not limited as in some prior art processes, since the microcapsule wall is formed by external polymerization of the wall forming compound and by the interaction of the wall forming compound with the cross-linking agent. The wall thickness can be controlled by the oil droplet size and relative amounts of wall forming compound and oil to be microencapsulated.

By the process of this invention, dispersions of approximately 40% microcapsules have been produced as compared to the more usual 25% obtained by prior art methods involving coacervation. Thus, the dispersion of microencapsulation can be used without dewatering in coating compositions where a high solids content is desirable.

Other patents considered relevant although inferior to the product and processes of this disclosure are:

U.S. Pat. No. 3,141,792 (1964) to Lachman et al.
U.S. Pat. No. 3,449,228 (1969) to Yurcheshen et al.
U.S. Pat. No. 3,779,942 (1973) to Bolles
U.S. Pat. No. 3,875,074 (1975) to Vassiliades et al.

All of the above patents and disclosures relate to microcapsules in general. The invention disclosed herein relates, specifically, to urea-formaldehyde-resorcinol microcapsules and more particularly to the process or the formation or manufacture of said urea-formaldehyde-resorcinol capsules. It should be noted that when referring to applicants' process the phrases "urea-formaldehyde capsules" and "urea-formaldehyde-resorcinol capsules" are used interchangeably. Such interchangeable use is not possible when describing the various prior art patents and applications. While the use of urea-formaldehyde-resorcinol capsules per se is well known in the art as demonstrated by the prior art cited hereinbelow, it has been shown that urea-formaldehyde-resorcinol microcapsules are capable of being produced by a variety of methods. Many advantages are enjoyed by each of the methods which are disclosed by the prior art; however, each also suffers from commercial disadvantages. The process disclosed herein and enjoyed by applicants is commercially and economically superior to those processes disclosed by the prior art for the manufacture of urea-formaldehyde-resorcinol microcapsules.

In particular, most of the prior art relates to the use of various regulating agents, systems modifiers, catalysts and other chemical additives to the urea-formaldehyde-resorcinol process and the pH adjustment steps which are concomitant with such chemicals. In particular, attention is drawn to U.S. Pat. Nos. 4,001,140 (1977); 4,087,376 (1978); and 4,089,802 (1978), all of which were issued to Foris et al. and deal with the manufacture of urea formaldehyde microcapsules. The only distinction between these three patents is the particular "systems modifier" which is recited. In U.S. Pat. No. 4,001,140, this material is described as a "negatively charged, carboxyl-substituted, linear aliphatic hydrocarbon polyelectrolyte material." This is, in fact, the generic description for the systems modifier described in all three of these patents. Each patent contains a separate listing of the precise chemicals which are applicable and which fall under the generic description.

Additional prior art which deals in general with urea-formaldehyde microcapsules consists of Japanese Patent Publication No. 12518/63 and Japanese patent application No. 9079/79 (an unexamined Japanese patent application) as well as pending U.S. application Ser. No. 926,369 which was filed in July of 1978, now U.S. Pat. No. 4,251,396, issued on Feb. 17, ,1981.

Finally, other patents mentioning urea-formaldehyde and in some instances going into minor detail regarding urea-formaldehyde microcapsules include:

U.S. Pat. No. 3,016,308 (1962) to Macaulay
U.S. Pat. No. 3,516,846 (1970) to Matson
U.S. Pat. No. 3,594,328 (1971) to Schibler
U.S. Pat. No. 3,607,775 (1971) to Yoshida et al.
U.S. Pat. No. 3,660,304 (1972) to Matsukawa
U.S. Pat. No. 3,669,899 (1972) to Vassiliades et al.
U.S. Pat. No. 3,778,383 (1973) to Schibler et al.

As can be seen from the above, there is substantial prior art dealing with the urea-formaldehyde microcapsules. However, it is applicant's opinion that all of the prior art mentioned hereinabove suffer from commercial and economic disadvantages which are not characteristic of applicant's improved urea-formaldehyde manufacturing process. In general, it can be stated with regard to some of the above encapsulation processes that the wall membrane of the microcapsules prepared suffer from thermal stability and strength properties when oily solutions are used as the internal phase as in the carbonless paper environment. In many instances, the carbonless paper manufactured using these microcapsules is subject to premature color formation and capsule leakage. In addition, other disadvantages which are sometimes characteristic of many capsular systems are evidenced by some of the prior art systems, namely, non-uniform capsule size; inability to form small microcapsules; inability to withstand storage and use conditions and lack of appropriate rupturability in the formation of carbonless papers. These and other disadvantages of the prior art are overcome by applicant's process.

STATEMENT OF INVENTION

A process is disclosed for the manufacture of microcapsules which comprises the steps of preparing hydrophobic and hydrophilic phase components. The hydrophobic phase component comprises a homogeneous solution of an electron donating chromogenic material and a hydrophobic material. The hydrophilic phase component comprises a mixture of a regulating agent and water, the regulating agent being a starch material. The hydrophobic phase component is combined with a hydrophilic phase component to form an oil-in-water emulsion. The oil-in-water emulsion further contains aqueous solutions of urea, resorcinol and formaldehyde. The pH of the oil-in-water emulsion is adjusted to a level at which the capsule wall forming reaction is initated by the addition of a catalyst. The temperature of the partially reacted oil-in-water emulsion is then elevated to from about 50° C. to about 80° C. and this temperature is maintained for a period of time sufficient to form discrete microcapsules characterized by being substantially impermeable to the hydrophobic emulsion component.

DESCRIPTION OF THE PREFERRED EMBODIMENT

The process of this invention includes the steps of preparing the hydrophobic phase component which includes a homogeneous solution of a chromogenic material of the electron donating type, as well as a hydrophobic material. The hydrophobic material can be any of a variety of well known organic solvents which are known to have utility in the carbonless paper environment. In particular, deodorized kerosene or chlorinated paraffins have known utility as well as various combinations of deodorized kerosene and chlorinated paraffins. However, in addition to these, other such as monoisopropylbiphenyl, chlorinated biphenyls, alkyl phthalates, alkyl naphthalene, petroleum naphtha, hydrogenated terphenyls, alkyl phosphates, alkyl biphenyls, alkyl benzoates, chlorinated biphenyls, and mixtures of the like have shown satisfactory properties.

The chromogenic color precursor most useful in the practice of this invention are the electron donors described generally as the lactone phthalides, lactone fluorans, lactone xanthenes, indols, auramines and combinations thereof. These would include the lactone phthalides, such as crystal violet lactone, and 3,3-bis-(1'ethyl-2'methylindol-3'-yl) phthalide, the lactone fluorans, such as 2-N,N-dibenzylamino-6- diethyl-aminofluoran and 6-diethylamino-1,3-dimethyl fluoran, the lactone xanthenes, the leucoauramines, the 2-(omega substituted vinylene)-3,3-disubstituted-3-H indols and 1,3,3-trialkylindolinospirans. Mixtures of these color precursors can also be used if desired. The preferred color precursor for use in the process of this invention is crystal violet lactone.

The hydrophobic phase component, sometimes referred to hereinafter as the oil phase, is prepared by dissolving the hydrophobic material and the color precursor at elevated temperatures for a time sufficient to permit a clear homogeneous solution. In practice, it has been shown that a temperature of from about 75° C. to about 120° C. are practical, while temperatures of 85° C. to about 110° C. are preferred. A time of from about 10 minutes to about 1 hour are generally functionally sufficient to permit the desired dissolving action to take place, although the precise time period may vary in inverse relationship to the temperatures used. However, these temperatures nor the time period are not critical and, in fact, can be varied depending upon the particular solvent or color precursor that are used. The chromogenic material is generally present in the hydrophobic phase component at a concentration of from about 0.1% to about 20% by weight and preferably from about 0.1% to about 10% by weight with the solvent material comprising the remaining 80% to 99.9%. Other materials can be used in the internal phase such as dispersing agents, color intensifiers, color inhibiters, and the like in small amounts.

In some instances, it has been shown beneficial to add only a portion of the hydrophobic/solvent material to the chromogenic material and to add a second portion of the hydrophobic material after dissolution has taken place. In the most preferred process of this invention, an oil phase is prepared by dissolving to a clear solution at 95° C. for 30 minutes a mixture of 8.2 grams of crystal violet lactone, 88 grams of chlorinated paraffin and 66 grams of deodorized kerosene. To this mixture is added an additional 66 grams of deodorized kerosene and with stirring, the oil phase is cooled to 30° C. before use.

The hydrophilic phase component of this invention, sometimes referred to hereinafter as the aqueous phase, is prepared by combining a regulating agent with water. In practice, it has been shown that hydrophilic phase component should comprise from about 3% to about 40% of the regulating agent and preferably from about 3% to about 10% by weight of the regulating agent.

Optionally, an emulsifying agent, such as an anionic polymeric material and specifically such as gum arabic or other synthetic anionic polymeric materials have known utility for an emulsifying action between the hydrophobic phase and water, may be added to the hydrophilic phase component. The emulsifying agent functions generally as a dispersing agent. The hydrophilic phase component preferably contains a combination of up to about 60 parts gum arabic and about 25 parts to about 100 parts of a starch material. Although the addition of the emulsifying agent is optional, it is preferred in order to facilitate the formation of uniform capsules.

A critical element in the process of this invention is the particular regulating agent which is used. As has been discussed in the prior art section of this disclosure, there have been many attempts to formulate and utilize urea-formaldehyde microcapsules in the past. Much of the inventive activity which has taken place heretofore has been in the area of formulating regulating agents or systems modifiers or the like. See, for example, the Foris et al. patents and the aforementioned pending U.S. patent application. The regulating agents which have utility in the process of this invention are generally described as being starch materials.

The starch materials useful in this invention include corn starch, potato starch, wheat starch, rice starch, tapioca starch, oxidized starches, and modified starches, cationic starches and other starch derivatives such as the ethylated starches and hydroxyethyl ether derivatives of starches. A preferred starch is the hydroethyl ether derivative of corn starch known as Penford Gum 280. This starch is commercially available from Penick and Ford, Ltd., Cedar Rapids, Iowa.

At this particular point in the microcapsule formation process, a hydrophobic phase component and a hydrophilic phase component are present. The hydrophobic phase component is then emulsified into the hydrophilic phase component by the use of agitation. The emulsion is agitated by a low shear milling action for a period of time sufficient to obtain the desired droplet size, preferably about 5 to about 12 microns.

To the resulting emulsion are added solutions of urea, resorcinol, formaldehyde and ammonium sulfate catalyst. Each of these additional ingredients is added together as a solution with water. The formaldehyde is added in the most preferred embodiment of this invention as formalin at 37% solid. Although the specific concentration and/or level of addition of the urea, resorcinol and formaldehyde is somewhat variable, it has been found that most satisfactory results are obtained when said materials are added individually in levels of from about 0.5% to about 20.0% and preferably from about 0.5% to about 10.0% based on the dry weight of the emulsion components.

Alternatively, the aqueous solutions of urea, resorcinol and formaldehyde may be individually added to the hydrophilic phase component prior to emulsification of the hydrophobic emulsion component into the hydrophilic phase component. The exact order of addiing the aqueous solutions is not critical, except that the aqueous solution of the catalyst should not be added prior to the emulsification step. Also, it is preferable to add the formaldehyde after the aqueous solutions of urea and resorcinol.

Although ammonium sulfate is a preferred catalyst, any ammonium salt of a strong acid may be used. Other catalysts which could be used include ammonium chloride and ammonium phosphate. The purpose of adding the catalyst is to reduce the pH of the emulsion to a level at which the wall-forming reaction is intiated. Using ammonium sulfate, which is the preferred catalyst, the emulsion reaches a pH of approximately 4.0.

The resulting mixture is the heated to from about 50° C. to about 80° C. and more preferably 60° C. to 70° C. and maintained at said elevated temperature for a sustained period of time of up to about 5 hours, although preferably 1 hour to about 3 hours is functionally effective. The particular temperature and time for retained temperature are interdependent and are otherwise dependent upon the ingredients and precise concentrations of ingredients initially used.

The microcapsules which are formed by the process of this invention have a mean capsule size of from about 4 to about 20 microns, more preferably from about 4 to about 10 microns and most preferably from about 5 to about 8 microns. The urea-formaldehyde-resorcinol microcapsules prepared by the process of this invention have shown exceptional utility in the carbonless paper environment. This utility has been shown by the unusually even size distribution of the urea-formaldehyde microcapsules, together with the ability to obtain uniformly sized small microcapsules. In addition, the microcapsules of this invention exhibit high temperature stability and resistance, as well as extremely low levels of premature discoloration caused by capsule permeability and accidental breakage.

It is important to note that the regulating agent of this invention is not of necessity included in the finished capsule walls in measurable amounts. The regulating agent takes an active role in the pplumerization reaction which forms the condensed capsule walls around the hydrophobic material. However, the precise chemical activity of the regulating agent is not clearly understood, although its absence from the process prevents the formation of commercially acceptable microcapsules. It is believed that the regulating agent acts as a control for the reaction rate.

The microcapsules which are formed by the process of this invention are generally characterized as being urea-formaldehyde microcapsules and have found great utility in the carbonless paper environment. In particular, and as has been pointed out heretofore, a variety of characteristics are emphasized by the use of the urea-formaldehyde microcapsules resulting from the process of this invention which enables the microcapsules to have superior utility in the manufacture of carbonless paper. In particular, the permeability characteristics of the wall membrane; i.e., being impermeable to both the hydrophilic and hydrophobic phases normally present in carbonless paper, as well as the unusually and unexpectedly uniform size distribution of the microcapsules are beneficial in the carbonless paper environment.

Additionally, the fact that this uniform size distribution can be controlled within a limited range and be used to manufacture relatively small diameter microcapsules all translates into a superior carbonless paper product. Although the ultimate product, which is preferred in using these urea-formaldehyde microcapsules, is carbonless copy paper this is not to be interpreted to mean that other uses are not equally viable. It is certainly possible to encapsulate any material desired in the microcapsule wall and with appropriate temperature and pH differentials, the size of the capsule wall of the microcapsule can be conveniently controlled within certain limitations.

In the manufacture of carbonless paper, the microcapsules of this invention, which contain a hydrophobic internal phase, are formed into a coating emulsion. This coating emulsion can take one of several forms. In traditional coating processes, it would be expected that the microcapsules would be incorporated into a solvent continuous phase and then coated onto a paper base. The continuous phase could be aqueous, a volatile solvent or even a drying-oil solvent. Each of the particular solvents demonstrates particular characteristics which are benficial to one or more desired products and processes. The specific manner of coating the urea-formaldehyde microcapsules onto paper is not considered an inventive feature here, but rather one which is well within the ambit of the disclosed prior art.

A second preferred method for incorporating the microcapsules of this invention into a continous phase for coating or printing onto paper is by incorporation of the microcapsules into a hot melt or radiation curable continous phase. Any of a large variety of wax materials have established utility in the carbonless paper area. Both polar and nonpolar waxes and blends of polar and nonpolar waxes have established utility as well as waxes which are characterized as being natural or synthetic. In short, any waxes which result in a carbonless paper product which has a clarity, color, appearance, and other characteristics which are acceptable to the end-user are fully satisfactory for use with the microcapsules of this invention.

In the radiation curable arts, it has been well established that a variety of known radiation curable materials can be used for formulating a coating composition for use with the microcapsules of this invention. In particular, the acrylates and polyacrylates and especially those which are ethylenically unsaturated, as well as combinations of all of these, have established utility in the coating area. Both the hot melt materials and radiation curable materials which are generally described hereinabove can be used in combination with the microcapsules of this invention to formulate a coating composition which can either be coated onto paper by traditional coating means; i.e., air knife, blade coating, or other, or in the alternative, it can be printed onto a paper surface by traditional printing means; i.e., rotogravure, gravure, flexographic, offset flexographic, offset gravure and the like.

In formulating the coating compositions using the microcapsules of this invention, the particular concentration of capsules is not critical. What is critical is that the amount of capsules present in the coating composition be of a functional quality and be present in a concentration which is functional to provide the desired image forming characteristics. Depending on the particular end product desired, the concentration may be high or low and may be modified within the same product.

The preferred embodiments of this invention are described in greater detail hereinbelow by reference to the following examples. It should be understood that these examples are given for purposes of illustration only and are not intended to be limitations on the process of this invention. Unless otherwise indicated, all parts, percents, ratios and the like are by weight.

EXAMPLE 1

A mixture is prepared by combining together 152 grams of chlorinated paraffin, approximately 40% chlorination, with 117 grams of deodorized kerosene and 14.2 grams of crystal violet lactone. A homogeneous solution of this mixture is obtained by heating to 90°-95° C. for a period of 30 minutes with continuous agitation. The resultant mixture is then diluted with an additional aliquot of 117 grams of deodorized kerosene and cooled to 25°-30° C. The diluted mixture is termed the hydrophobic phase.

An aqueous solution of gum arabic is prepared by combining 13.8 grams of gum arabic with 124 grams of water and stirring, gently for a period of about 30 minutes at room temperature. To the gum arabic solution is then added 508 grams of a 10% solution of a hydroxy ethyl ether derivative of corn starch that has been heated to 90° C. for a period of 30 minutes and then cooled to ambient temperature. This mixture is termed the hydrophilic phase.

To the hydrophilic phase is added in the following sequence, a solution of 52 grams of urea dissolved in 75 grams of water, and a solution of 9.8 grams of resorcinol dissolved in 26 grams of water. This mixture is placed in a Waring Blender. Using an in-line Variac setting of 50-60 volts and a blender setting of low, the hydrophobic phase is added to the hydrophilic phase. After the hydrophobic phase is added, 133 grams of 37% formaldehyde, methanol inhibited, is immediately added. Emulsification is continued until an emulsion with a mean particle size in the range of 4-8 microns is obtained.

The resultant emulsion is transferred to a heating container. To the same container is then added a solution of 4.9 grams of ammonium sulfate in 92 grams of water. With continuous mixing, the contents of the container are rapidly heated to 65° C. The contents of the container are maintained at 65°-70° C. for a period of 2 hours. The pH of the contents is then adjusted to 9.0±0.2 using 20% aqueous sodium hdyroxide solution. To the contents is then added 15 grams of anhydrous sodium bisulfite.

The microcapsules are suitable for formulation into conventional pressuresensitive carbonless paper coatings.

EXAMPLE 2

A mixture was prepared by combining together 220 grams of a chlorinated paraffin, approximately 40% chlorination, with 110 grams of deodorized kerosene and 12.8 grams of crystal violet lactone. A homogeneous solution of this mixture was obtained by heating to 90°-95° C. for a period of 30 minutes with continuous agitation. The resultant mixture was then diluted with an additional aliquot of 110 grams of deodorized kerosene and cooled to 25°-30° C. to form the hydrophobic phase.

An aqueous solution of gum arabic was prepared by combining 16 grams of gum arabic with 143 grams of water and stirring gently for a period of about 30 minutes at room temperature. An aqueous solution of unmodified corn starch was prepared by adding 29 grams of unmodified corn starch to 532 grams of water at room temperature and then heating to 88° C. with continuous agitation for a period of 20 minutes. This solution was then cooled to 30° C. The aqueous solutions of gum arabic and unmodified corn starch were combined with 60 grams of urea dissolved in 90 grams of water and 11 grams of resorcinol dissolved in 30 grams of water in a large Waring Blender to form the hydrophilic phase.

The hydrophobic phase is added to the hydrophilic phase in the Waring Blender at a Variac setting of 50-60 volts. Immediately after the addition of the hydrophobic phase, 154 grams of 37% formaldehyde, methanol inhibited was added and emulsification was continued until an emulsion with a mean particle size in the range of 4-8 microns was obtained. The resultant emulsion was transferred to a heating container. To the same container was then added a solution of 5.7 grams of ammonium sulfate in 75 grams of water. With continuous mixing, the contents of the container were maintained at 55° C. to 60° C. for a period of 3 hours.

The pH of the contents was then adjusted to 9.0±0.2 using an aqueous solution of 20% sodium hydroxide. To the contents was then added 25 grams of anhydrous sodium bisulfite.

The microcapsules had a mean particle size of 7.9 microns as determined by a Coulter Counter and a permeability of 2.5%.

Permeability as herein used is expressed as a percentage figure and is actually 100 times the ratio of the quantity of dye obtained by extraction of the capsules by the oil of the internal phase to the total quantity of dye obtained by this extraction plus that obtained by extraction of the microcapsules with a material which destroys the capsule wall. In each case, the color of the dye was developed by stannic chloride and the quantity of dye was determined spectrophotometrically.

The microcapsules were suitable for formulation into conventional pressure sensitive carbonless paper coatings.

EXAMPLE 3

A mixture was prepared by combining together 220 grams of a chlorinated paraffin, approximately 40% chlorination, with 110 grams of deodorized kerosene and 12.8 grams of crystal violet lactone. A homogeneous solution of this mixture was obtained by heating to 90°-95° C. for a period of 30 minutes with continuous agitation. The resultant mixture was then diluted with an additional aliquot of 110 grams of deodorized kerosene and cooled to 25°-30° C. to form the hydrophobic phase.

An aqueous solution of gum arabic was prepared by combining 16 grams of gum arabic with 143 grams of water and stirring gently for a period of about 30 minutes at room temperature. An aqueous solution of unmodified potato starch was prepared by adding 29 grams of unmodified potato starch to 532 grams of water at room temperature and then heating to 88° C. with continuous agitation for a period of 20 minutes. This solution was then cooled to 30° C. The aqueous solutions of gum arabic and unmodified potato starch were combined with 60 grams of urea dissolved in 90 grams of water and 11 grams of resorcinol dissolved in 30 grams of water in a large Waring Blender to form the hydrophilic phase.

The hydrophobic phase is added to the hydrophilic phase in the Waring Blender at a Variac setting of 50-60 volts. Immediately after the addition of the hydrophobic phase, 154 grams of 37% formaldehyde, methanol inhibited was added and emulsification was continued until an emulsion with a mean particle size in the range of 4-8 microns was obtained. The resultant emulsion was transferred to a heating container. To the same container was then added a solution of 5.7 grams of ammonium sulfate in 75 grams of water. With continuous mixing, the contents of the container were rapidly heated to 55° C. The contents of the container were maintained at 55° C. to 60° C. for a period of 3 hours.

The pH of the contents was then adjusted to 9.0±0.2 using an aqueous solution of 20% sodium hydroxide. To the contents was then added 25 grams of anhydrous sodium bisulfite.

The microcapsules had a mean particle size of 11.5 microns and a permeability of 1.5%. The microcapsules were suitable for formulation into conventional pressure sensitive carbonless paper coatings.

EXAMPLE 4

A mixture was prepared by combining together 220 grams of a chlorinated paraffin, approximately 40% chlorination, with 110 grams of deodorized kerosene and 12.8 grams of crystal violet lactone. A homogeneous solution of this mixture was obtained by heating to 90°-95° C. for a period of 30 minutes with continuous agitation. The resultant mixture was then diluted with an additional aliquot of 110 grams of deodorized kerosene and cooled to 25°-30° C. to form the hydrophobic phase.

An aqueous solution of gum arabic was prepared by combining 16 grams of gum arabic with 143 grams of water and stirring gently for a period of about 30 minutes at room temperature. An aqueous solution of cationic potato starch was prepared by adding 29 grams of cationic potato starch to 532 grams of water at room temperature and then heated to 88° C, with continuous agitation for a period of 20 minutes. This solution was then cooled to 30° C. The aqueous solutions of gum arabic and cationic potato starch were combined with 60 grams of urea dissolved in 90 grams of water and 11 grams of resorcinol dissolved in 30 grams of water in a large Waring Blender to form the hydrophilic phase.

The hydrophobic phase is added to the hydrophilic phase in the Waring Blender at a Variac setting of 50-60 volts. Immediately after the addition of the hydrophobic phase, 154 grams of 37% formaldehyde, methanol inhibited was added and emulsification was continued until an emulsion with a mean particle size in the range of 4-8 microns was obtained. The resultant emulsion was transferred to a heating container. To the same container was then added a solution of 5.7 grams of ammonium sulfate in 75 grams of water. With continuous sufficient mixing, the contents of the container were maintained at 55° C. to 60° C. for a period of 3 hours.

The pH of the contents was then adjusted to 9.0±0.2 using an aqueous solution of 20% sodium hydroxide. To the contents was then added 25 grams of anhydrous sodium bisulfite.

The microcapsules had a mean particle size of 11.5 microns and a permeability of 3.0%. The microcapsules were then suitable for formulation into conventional pressure sensitive carbonless paper coatings.

What is claimed is:

1. A process for the manufacture of microcapsules comprising the steps of:
   (a) preparing a hydrophobic phase component comprising a homogeneous solution of an electron donating chromogenic material and a hydrophobic material;

(b) preparing a hydrophilic phase component comprising a mixture of a regulating agent and water, said regulating agent comprising a starch material, said regulating agent being present in said hydrophilic phase component at a concentration of from 3% to 40% by weight;

(c) combining said hydrophobic phase component and said hydrophilic phase component to form an oil-in-water emulsion; said oil-in-water emulsion further comprising
  (i) an aqueous solution of urea;
  (ii) an aqueous solution of resorcinol; and
  (iii) an aqueous solution of formaldehyde;

(d) adjusting the pH of said oil-in-water emulsion to a level at which a wall forming reaction is initiated by the addition of a catalyst;

(e) elevating the temperature of said partially reacted oil-in-water emulsion to from about 50° C. to about 80° C.; and (f) maintaining the temperature of said oil-in-water emulsion at from about 50° C. to 80° C. for a period of time sufficient to form discrete microcapsules characterized by being substantially impermeable to said hydrophobic emulsion component.

2. The process of claim 1 wherein said electron donating chromogenic material is present in said hydrophobic phase component in a concentration of from 0.1 to 10.0, by weight, and selected from the group consisting of: lactone phthalides, lactone fluorans, lactone xanthenes, indols, auramines and combinations thereof.

3. The process of claim 1 wherein said hydrophobic material is selected from the group consisting of: chlorinated paraffin, hydrogenated terphenyls, alkyl naphthalenes, alkyl phthalates, alkyl phosphates, alkyl bipenyls, alkyl benzoates, chlorinated biphenyls and combinations thereof.

4. The process of claim 1 wherein said regulating agent is present in said hydrophilic phase component at a concentration of from 3% to 10% by weight.

5. The process of claim 1 wherein said catalyst is ammonium sulfate.

6. The process of claim 1 wherein said temperature of said oil-in-water emulsion is maintained at from about 60° C. to about 70° C. for from about 1 hour to about 3 hours.

7. The process of claim 1 wherein said hydrophilic emulsion component contains a combination of up to about 60 parts by weight of gum arabic and from about 25 to about 100 parts by weight of said starch material.

8. The process of claim 1 wherein said starch material is selected from the group consisting of: corn starch, potato starch, rice starch, tapioca starch, oxidized starches, acid modified starches, ethylated starches, hydroxyethyl ether derivatives of starches, cationic starches, and mixtures thereof.

9. The process of claim 1 wherein said starch material is a hydroxy ethyl ether derivative of corn starch.

10. The process of claim 1 wherein the pH of said oil-in-water emulsion is adjusted to from about 3 to about 4.

11. A process for the manufacture of microcapsules comprising the steps of:

(a) preparing a hydrophilic phase component comprising a homogeneous solution of an electron donating chromogenic material selected from the group consisting of: phthalides, fluorans, xanthenes, indols, auramines and combinations thereof; and a hydrophobic material selected from the group consisting of: chlorinated paraffin, hydrogenated terphenyls, alkyl naphthalenes, alkyl phthalates, alkyl phosphates, alkyl biphenyls, alkyl benzoates, chlorinated biphenyls and combinations thereof, said chromogenic material being present in said hydrophobic phase in an amount of from about 1 to about 10 parts by weight;

(b) preparing a hydrophilic phase component comprising a mixture of a regulating agent and water, said regulating agent comprising up to about 60 parts by weight of gum arabic and from about 25 to 100 parts by weight of a starch material, said regulating agent being present in said hydrophilic phase component at a concentration of from 3% to 40% by weight:

(c) combining said hydrophilic phase component with:
  (i) an aqueous solution of urea;
  (ii) an aqueous solution of resorcinol; and (d) combining said hydrophobic phase component and said hydrophilic phase component to form an oil-in-water emulsion;

(e) combining an aqueous solution of formaldehyde and said oil-in-water emulsion;

(f) adjusting the pH of said oil-in-water emulsion by the addition of an ammonium sulfate catalyst to from about 3 to about 4, said pH level being sufficient to initiate a wall forming reaction;

(g) elevating the temperature of said partially reacted oil-in-water emulsion to from about 60° C. to about 70° C.; and (h) maintaining the temperature of said oil-in-water emulsion at from about 60° C. to about 70° C. for from about 1 hour to about 3 hours to form discrete microcapsules characterized by being substantially impermeable to said hydrophobic emulsion component.

12. The process of claim 11 wherein said starch material is a hydroxyl ethyl ether derivative of corn starch.

13. The process of claim 11 wherein said regulating agent is present in said hydrophilic phase component at a concentration of from 3% to 10%.

* * * * *